United States Patent Office 3,447,611
Patented June 3, 1969

3,447,611
TWO-STAGE SPEED REDUCTION MECHANISM FOR DRIVING TWO MARINE PROPELLERS
Per Erik Arne Larsson and Per Gosta Thornblad, Finspong, Sweden, assignors to Stal-Laval Turbin AB, Finspong, Sweden
Filed Nov. 10, 1966, Ser. No. 593,335
Claims priority, application Sweden, Dec. 9, 1965, 16,000/65
Int. Cl. B23h 5/10; F16h 1/22
U.S. Cl. 170—135.28                     4 Claims

ABSTRACT OF THE DISCLOSURE

Two-stage speed reduction gear mechanism for propeller-driven craft having two coaxially extending propeller shafts, one being tubular and the other one being rotatable therein, each of the shafts supporting a gearwheel unit for driving the respective shafts individually, which units are arranged in parallel spaced relationship and a planetary gear unit located between the gearwheel units, the sun wheel of which is driven by the power source, the planet carrier thereof being connected to a pinion meshing with one of the gear wheels for driving one of the propeller shafts, while the internal gear ring is connected to another pinion for driving the other gear wheel and the corresponding propeller shaft.

---

This invention relates to mechanism for the drive of marine propellers, and more particularly to a means by which two concentrically arranged propellers are driven.

The invention has particular reference to a two-stage speed reduction means employing two parallel gearing units in its second stage, for driving two propellers. One of the propellers is secured to an inner shaft, located within an outer tubular shaft, the tubular shaft being disposed axially with the inner shaft, the second propeller being carried by the outer tubular shaft.

The present invention employs a speed reduction means in the first stage which comprises a planetary gearing, the sun gear of which is connected to a driving mechanism, with the planetary gear carrier being connected to a pinion of one of the parallel gearing units for operating one of the propeller shafts. The inner gear ring of the planetary gearing is connected to a pinion of the second planetary gearing for operating the second propeller shaft.

It is an object of the invention to provide a two-propeller drive of this character by which greater operating efficiency can be secured by the use of the two counter-rotating propellers driven by the described mechanism than can be secured by a single propeller rotating at the same speed or number of revolutions.

With these and other objects to be hereinafter set forth in view, we have devised the arrangement of parts to be described and more particularly pointed out in the claim appended hereto.

Figure 1:
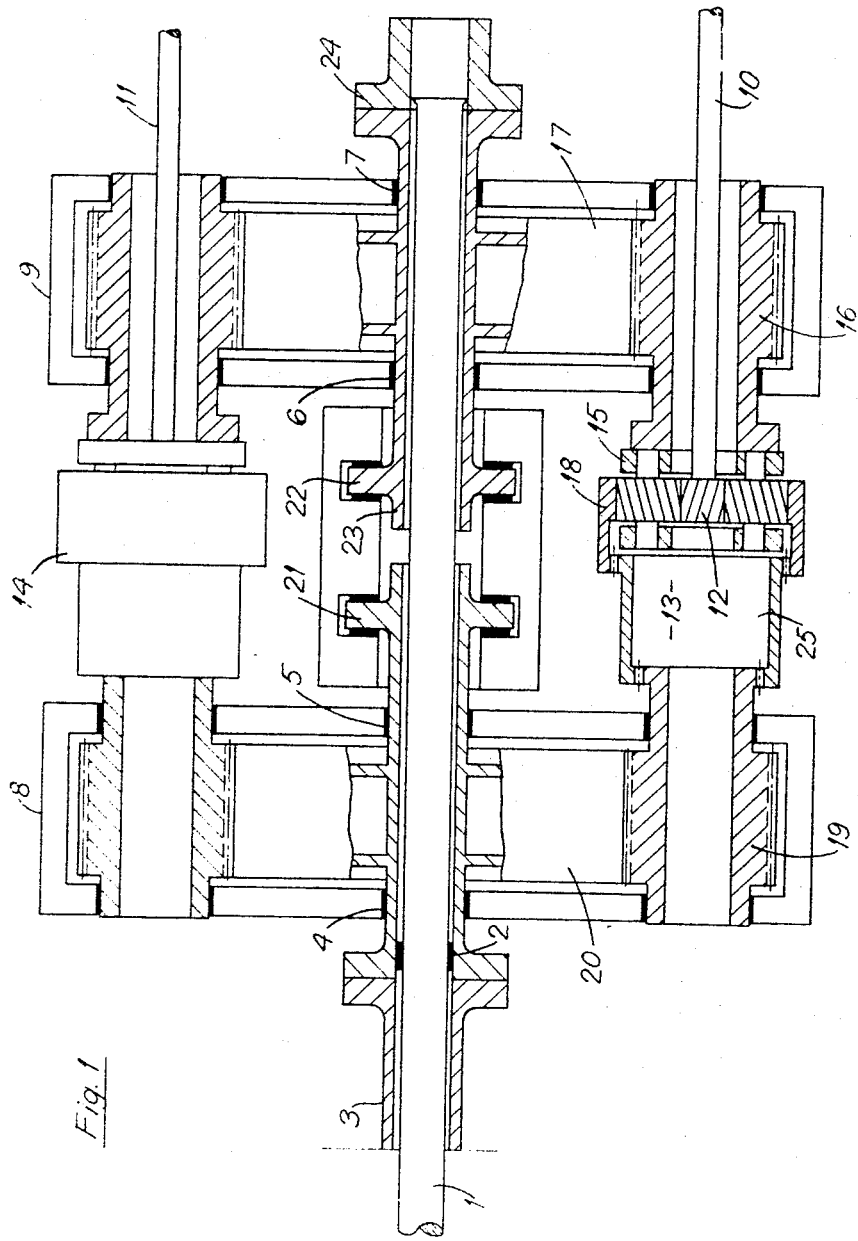
Figure 2:
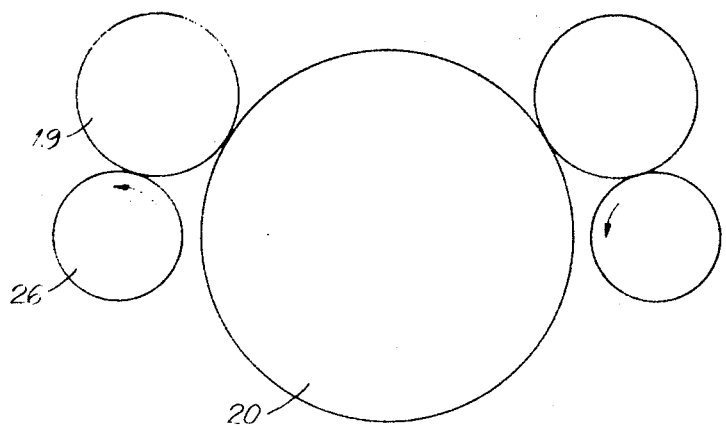

In the accompanying drawings, wherein an illustrative embodiment of the invention is disclosed, FIG. 1 is an axial view through driving gearing constructed according to the invention, and FIG. 2 shows diagrammatically an end view of a modified embodiment of the invention.

Referring to the drawings, and particularly to FIG. 1 thereof, an inner propeller shaft is indicated at 1, the same being journaled in a bearing 2 contained within an outer propeller shaft 3. The outer shaft 3 is of tubular form and the inner shaft 1 is located concentrically within the same. The outer shaft 3 is journaled in the bearings shown at 4 and 5. The shafts 1 and 3 each support a propeller (not shown) and they are driven by means of parallel gearing units shown respectively at 8 and 9. The reference numerals 10, 11 indicate shafts extending from suitable driving mechanisms, not shown. Each of the shafts 10 and 11 is connected to a sun gear 12 in a planetary gear 13 and 14, respectively, the planet wheel carrier 15 of which is attached to a pinion 16 in engagement with a gear 17 in the parallel gearing unit 9, while the inner gear ring 18 of the planetary gear 13 is connected to a pinion 19 engaging with a gear 20 of the second parallel gearing unit 8.

Due to the fact that the planet carrier 15, as well as the inner gear ring 18 is mounted for free rotation, as opposed to conventional planetary gears, the pinions 16, 19 will rotate in opposite directions, as also do the gears 17, 20 and the two propeller shafts 1 and 3.

The ratio between the number of revolutions of the planet carrier 15 and the inner gear ring 18 is not geometrically determined but is a function of the distribution of torque. Thus, with the present gear arrangement, the ratio of the revolutions of the propeller shaft is a function of the ratio of the torque loads.

Thrust forces from the two propeller shafts are absorbed by two thrust bearings 21, 22 which are combined in a manner to form a single unit and are located between the two parallel gearing units 8 and 9.

The gear 17 for the inner shaft 1 is supported by a tubular shaft 23 that is journaled in the bearings 6 and 7. The said tubular shaft 23 is connected at one end to a thrust bearing 22 and at the other end to a coupling 24 that is secured to the shaft 1. At 25 is indicated a resilient element in the form of a gear coupling, between the inner gear ring 18 and the pinion. Since the pinions 16 and 17 rotate in opposite directions, the center line of the said pinions will not coincide owing to climb on the bearings. The said difference between the positions of the center line will be taken up by the said gear coupling 25.

A gear arrangement for contrarotating propellers can be readily modified so that the two propeller shafts will then rotate in the same direction by replacing, according to FIG. 2, the pinion 19 in the parallel gearing unit 8 with another pinion 26, the diameter of which is so much smaller than that of the first pinion so that the pinion 26 will not engage the gear 20. The original pinion 19 is positioned as a reverser between the pinion 26 and the gear 20. Since both the planet carrier and the inner gear ring can rotate in the planetary gearing it can be used for a greater ratio than if one of these members was locked fast.

Having thus described an embodiment of the invention, it is obvious that the same is not to be restricted thereto, but is broad enough to cover all structures coming within the scope of the annexed claims.

What we claim is:

1. A two-stage speed reduction gear mechanism for propeller-driven craft having two coaxial propeller shafts extending within one another, comprising:

a secondary stage reduction gearing unit for driving each of said shafts individually and arranged in parallel spaced relationship, each of said gearing units including a gear wheel carried by its respective propeller shaft and a pinion meshing therewith, and a primary stage speed reduction planetary gear unit including a sun wheel, a planet wheel carrier, and an internal gear ring, said planetary gear unit located between said gear wheels of secondary gearing unit, the sun wheel of said planetary gear unit being connected to a means for driving said sun wheel, the planet wheel carrier being connected to the pinion of one of said gear wheels for driving one of said propeller shafts, and the internal gear ring of said planetary gear unit being connected to the pinion of the other one of said gear wheels for driving the other propeller shaft.

2. A two-stage speed reduction gear mechanism according to claim 1 having a plurality of said planetary gear units, each of which are connected to a drive means.

3. A two-stage speed reduction gear mechanism according to claim 1 wherein the internal ring of the planetary gear unit is connected to the pinion by a resilient element constituting a gear coupling.

4. A two-stage speed reduction gear mechanism according to claim 1 in which a second pinion of smaller diameter is located between the gear wheel and the first pinion of one of said secondary stage gearing units, the diameter of said second pinion being so selected that it runs free of the gear wheel, whereby the first pinion will act as a reverser for the purpose of obtaining the same direction of rotation for both of the propeller shafts.

References Cited

UNITED STATES PATENTS

| 1,704,890 | 3/1929 | Gerson | 74—325 X |
| 2,305,454 | 12/1942 | Nallinger et al. | 170—135.28 |
| 2,826,255 | 3/1958 | Peterson | 170—135.75 |
| 3,148,556 | 9/1964 | Gibbs et al. | 74—325 |

FOREIGN PATENTS

| 896,459 | 11/1953 | Germany. |
| 897,803 | 11/1953 | Germany. |

EVERETTE A. POWELL, JR., *Primary Examiner.*

U.S. Cl. X.R.
74—665; 179—135.75